United States Patent
Nishiyama

(10) Patent No.: US 8,836,575 B2
(45) Date of Patent: Sep. 16, 2014

(54) DETECTION DEVICE, RADAR APPARATUS, DETECTION METHOD AND DETECTION PROGRAM

(75) Inventor: Koji Nishiyama, Nishinomiya (JP)

(73) Assignee: FURUNO Electric Company, Nishinomiya, Hyogo-Pref. (JP)

( * ) Notice: Subject to any disclaimer, the term of this patent is extended or adjusted under 35 U.S.C. 154(b) by 451 days.

(21) Appl. No.: 13/286,248

(22) Filed: Nov. 1, 2011

(65) Prior Publication Data

US 2012/0127022 A1 May 24, 2012

(30) Foreign Application Priority Data

Nov. 19, 2010 (JP) ................................. 2010-259366

(51) Int. Cl.
*G01S 13/42* (2006.01)
*G01S 7/292* (2006.01)
*G01S 13/72* (2006.01)
*G01S 7/24* (2006.01)

(52) U.S. Cl.
CPC . *G01S 13/42* (2013.01); *G01S 7/24* (2013.01); *G01S 7/2923* (2013.01); *G01S 13/723* (2013.01)
USPC .............................. 342/146; 342/95; 342/185

(58) Field of Classification Search
CPC ....... G01S 13/5244; G01S 7/14; G01S 7/298; G01S 13/56; G01S 13/72; G01S 13/878; G01S 13/89; G01S 3/74; G01S 13/42; G01S 7/2923; G01S 7/723; G01S 7/24
USPC .................. 342/27, 95–97, 133, 139–140, 342/146–147, 185
See application file for complete search history.

(56) References Cited

U.S. PATENT DOCUMENTS

| | | | |
|---|---|---|---|
| 7,525,478 B2 * | 4/2009 | Takano et al. | 342/145 |
| 7,782,249 B2 * | 8/2010 | Shirakawa | 342/147 |
| 8,248,296 B2 * | 8/2012 | Maeno et al. | 342/96 |
| 8,310,392 B2 * | 11/2012 | Kojima et al. | 342/185 |
| 2008/0100503 A1 | 5/2008 | Yanagi et al. | |
| 2008/0316086 A1 * | 12/2008 | Hoctor et al. | 342/137 |
| 2009/0002222 A1 * | 1/2009 | Colburn et al. | 342/145 |
| 2009/0231184 A1 * | 9/2009 | Ding | 342/147 |
| 2009/0303107 A1 * | 12/2009 | Ando | 342/146 |
| 2010/0214151 A1 * | 8/2010 | Kojima et al. | 342/28 |
| 2011/0181459 A1 * | 7/2011 | Feger | 342/146 |
| 2012/0001791 A1 * | 1/2012 | Wintermantel | 342/109 |

FOREIGN PATENT DOCUMENTS

JP 2007-333482 A 12/2007

* cited by examiner

*Primary Examiner* — John B Sotomayor
(74) *Attorney, Agent, or Firm* — Birch, Stewart, Kolasch & Birch, LLP

(57) ABSTRACT

This disclosure provides a detection device, which includes an image data generation module for generating image data based on echo signals, and a target object detection module for determining an existence of a target object based on a level of the echo signal at each location of the image data for every azimuth. The target object detection module determines a continuity of the echo signals in a distance direction and an azimuth direction for every target object, and outputs an end location for each target object based on a determination result at each location, including a plurality of locations adjacent to a location determined as being a non-target object location.

12 Claims, 9 Drawing Sheets

DETECTION DEVICE, RADAR APPARATUS, DETECTION METHOD AND DETECTION PROGRAM

CROSS-REFERENCE TO RELATED APPLICATION(S)

The application claims priority under 35 U.S.C. §119 to Japanese Patent Application No. 2010-259366, which was filed on Nov. 19, 2010, the entire disclosure of which is hereby incorporated by reference.

TECHNICAL FIELD

The present invention relates to a detection device, method and program which detect a target object based on an echo signal, and also relates to a radar apparatus equipped with the detection device.

BACKGROUND OF THE INVENTION

Typical radar apparatuses detect a target object based on an echo signal and display an image of the echo on a display module (see JP2007-333482A). More specifically, the conventional target object detection is carried out as follows, for example.

The radar apparatus examines a level of the echo signals sequentially along a distance direction going from a location close to own ship toward a distant location from own ship, and stores information on continuous locations determined as having an echo level representative of a target object. The same processing is repeatedly carried out for all azimuth directions sequentially, and a similar continuity of the echo signals is also determined in the azimuth direction. When the continuity in the azimuth direction breaks off, this location is determined as a location of the target object.

However, for target objects such as a target ship located inside a bay, if it is surrounded by other target objects (land, bridges, etc.), the continuity of the echo signals may break off in the distance direction, and the above conventional target object detection cannot suitably detect the target objects.

SUMMARY OF THE INVENTION

Thus, the present invention is made in view of the above situations, and provides a detection device, method and program, that can suitably detect a target object, even when detecting a target object surrounded by other target objects, as well as provides a radar apparatus equipped with the detection device.

According to one aspect of the present invention, a detection device is provided, which includes an image data generation module for generating image data based on echo signals, and a target object detection module for determining an existence of a target object based on a level of the echo signal at each location of the image data for every azimuth. The target object detection module determines a continuity of the echo signals in a distance direction and an azimuth direction for every target object, and outputs an end location for each target object based on a determination result at each location, including a plurality of locations adjacent to a location determined as being a non-target object location.

The end location may include a starting location and a terminating location (in an azimuth direction and/or a distance direction). That is, since the starting location and/or the terminating location is determined for every target object in consideration of the continuity of the echo signals in the distance direction and/or the azimuth direction, the target object can suitably be detected even if the continuity of the echo signals breaks off in the distance direction.

Therefore, according to the above detection device, it can exactly detect the target object even if the target object is surrounded by other target objects.

In one embodiment, the target object detection module may output a terminating location of the target object, when relative to a location determined as being a non-target object location, it determines that a target object does not exist at an adjacent location along the same azimuth and an adjacent location in another azimuth.

In one embodiment, the target object detection module may save a last location, determined as being a non-target object location, as a temporary terminating location for every azimuth, and may output the corresponding location as the terminating location of the target object, when a location determined as being a non-target location coincides with the temporary terminating location.

Thereby, even if the target object has a complicate shape, the target object can exactly be detected. For example, a true terminating location can exactly be detected, even when the echo signal which looks like a terminating location of the target object occurs and another echo signal of the target object occurs again after that.

In one embodiment, the target object detection module may determine a location, determined as being a target object location, as a starting location of the target object, when relative to the location determined as being a target object location it determines that a target object does not exist at an adjacent location along the same azimuth and an adjacent location in another azimuth.

In one embodiment, the target object detection module may assign different identifiers to different target objects.

In one embodiment, the target object detection module may compare the echo signals of at least two adjacent azimuths.

In one embodiment, the target object detection module may compare the echo signals located at the same distance from the device.

In one embodiment, the detection device may further include a sweep memory for storing the inputted echo signals according to their azimuth and distance. The target object detection module may read out the echo signals from two adjacent azimuths from the sweep memory, and examine the levels of the echo signals of the observing azimuth, from the closest location to own ship to the most distant location. The target object detection module may compare the echo signal at each location determined as being a target object location with the echo signal at the same location in another adjacent azimuth. When the target object detection module determines that a target object exists at the same distance in another azimuth, it may determine that the target object of the observing azimuth and the target object in the other azimuth are the same target object.

In one embodiment, the target object detection module may output as the end location, the location of the echo signal of the observing azimuth that is determined as being a non-target object location, when it determines that a target object does not exist at a location at an adjacent distance along the same azimuth and a location at the same distance in another azimuth, and when a distance from own ship to the location determined as being a non-target object location is the same as a distance from own ship to a location that is first determined as being a non-target object location after locations determined as being target object locations continuously exist.

According to another aspect of the present invention, a radar apparatus is provided, which includes the detection device described above, an antenna for discharging electromagnetic waves for every azimuth, receiving the echo signals reflected on each target object, and inputting the echo signals into the image data generation module, and a display module for displaying a target object based on the image data generated by the image data generation module and the location of the target object determined by the target object detection module.

According to another aspect of the present invention, a detection method is provided, which includes inputting echo signals and generating image data based on the echo signals, and determining an existence of a target object based on a level of the echo signal at each location of the image data for every azimuth. The step of determining the existence of a target object comprises determining a continuity of the echo signals in a distance direction and an azimuth direction for every target object, and outputting an end location of each target object based on a determination result at each location, including a plurality of locations adjacent to a location determined as being a non-target object location.

According to another aspect of the present invention, a detection program, that is readable by a computer, is provided. The program includes causing a computer to input echo signals and generate image data based on the echo signals, and causing a computer to determine an existence of a target object based on a level of the echo signal at each location of the image data for every azimuth. Causing the computer to determine the existence of a target object comprises causing the computer to determine a continuity of the echo signals in a distance direction and an azimuth direction for every target object, and output an end location of each target object based on a determination result at each location, including a plurality of locations adjacent to a location determined as being a non-target object location.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
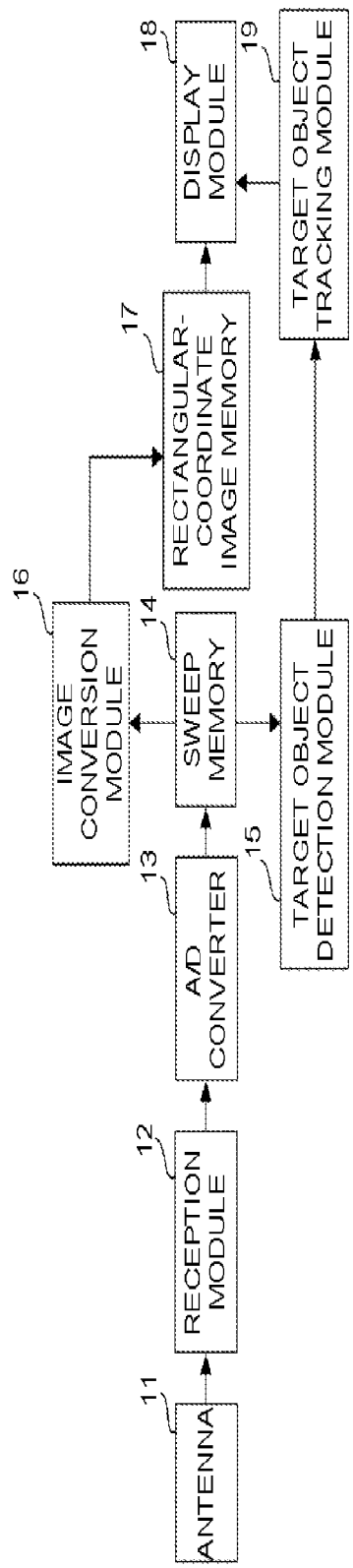
FIG. 1 is a block diagram showing a configuration of a radar apparatus of one embodiment.

FIG. 1 is a block diagram showing a configuration of a radar apparatus which is one mode of a detection device according to the present invention. The radar apparatus is typically installed, for example in a ship, transmits electromagnetic waves around own ship and receives corresponding echo signals, and detects target objects, such as other ships.

As shown in FIG. 1, the radar apparatus includes an antenna 11, a reception module 12, an A/D converter 13, a sweep memory 14, a target object detection module 15, an image conversion module 16, a rectangular-coordinate image memory 17, a display module 18, and a target object tracking module 19.

The antenna 11 transmits the electromagnetic waves in all directions around own ship and receives the echo signals. The reception module 12 outputs a value according to a level of the echo signal (echo level) received by the antenna 11 to the A/D converter 13. The A/D converter 13 carries out digital conversion of the inputted echo signal of an analog value and outputs it to the sweep memory 14.

The sweep memory 14 stores sweep data which is created by associating the inputted echo signal with coordinates of a polar coordinate system (an azimuth and a distance). Since the antenna 11 transmits the electromagnetic waves in the form of a pulse in every azimuth, the sweep data is stored as discrete values for every predetermined sampling and for every azimuth of the antenna 11 (sampling azimuth interval is suitably set depending on an application of the radar apparatus).

The image conversion module 16 inputs the sweep data of the polar coordinate system from the sweep memory 14, converts them into data of a rectangular coordinate system where the ship location is set to the origin, and outputs the converted data as pixel luminosity values of a gradation image according to the echo levels. The pixel luminosity values of the rectangular coordinate system are stored in the rectangular-coordinate image memory 17 as rectangular-coordinate image data.

Figure 2A:
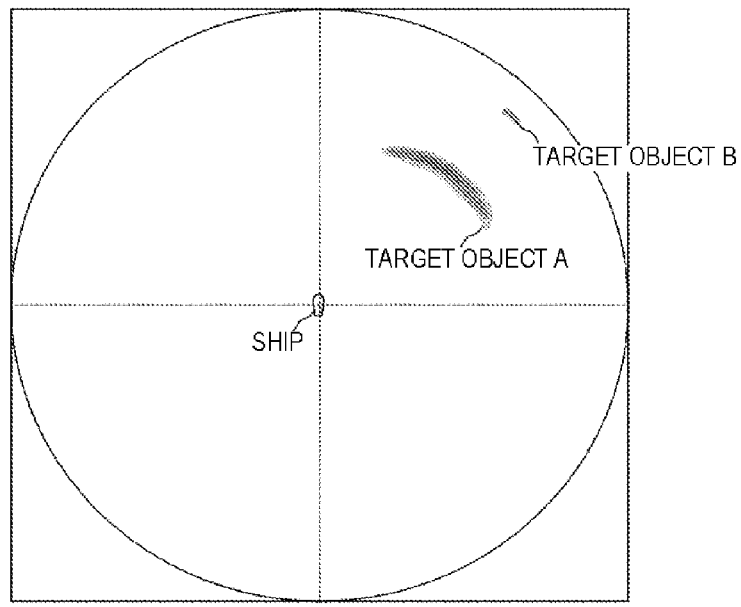
FIGS. 2A and 2B are diagrams showing a relation between target objects and sweep data.

The display module 18 reads out the rectangular-coordinate image data stored in the rectangular-coordinate image memory 17 and displays a radar image (echo image) as shown in FIG. 2A. FIG. 2A shows an example where a large target object A exists in a right front direction from the ship and a small target object B exists at a more distant location in the same azimuth.

Each time the transmission and reception of the electromagnetic waves in one azimuth (in the sampling azimuth, as described above) is finished and the sweep data for one sweep in the sweep memory 14 is updated, the target object detection module 15 reads out two or more sweep data containing the updated sweep data (at least the last sweep data) and carries out detection processing of target objects. The detection result of the target objects is outputted to the target object tracking module 19, and used for an indication of the location of the target objects (representative points), for example on the display module 18.

Figure 2B:
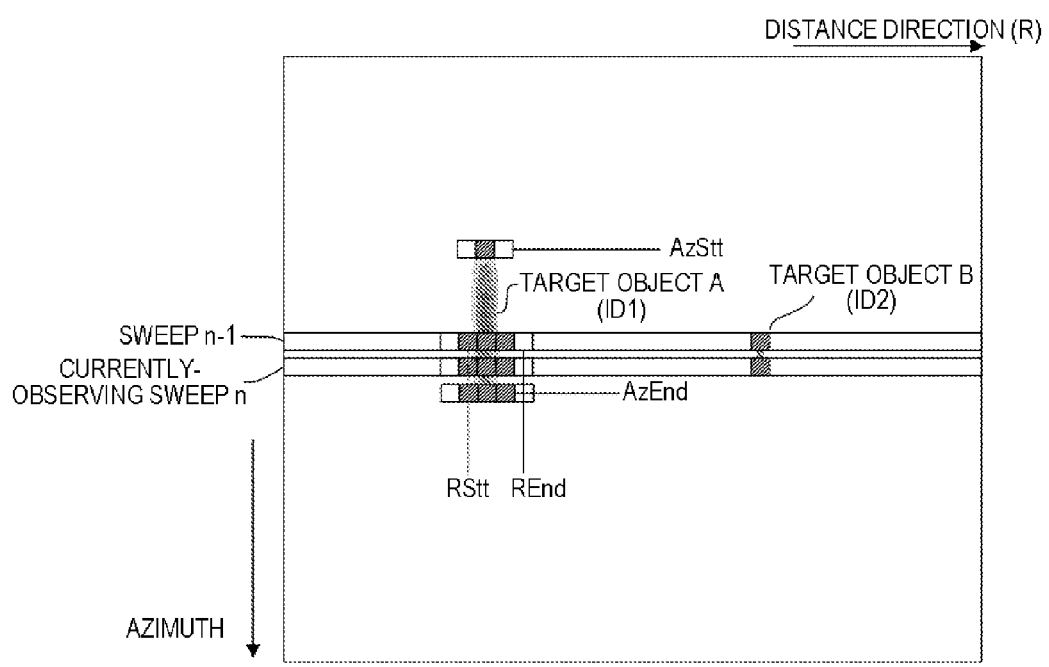
Figure 9:
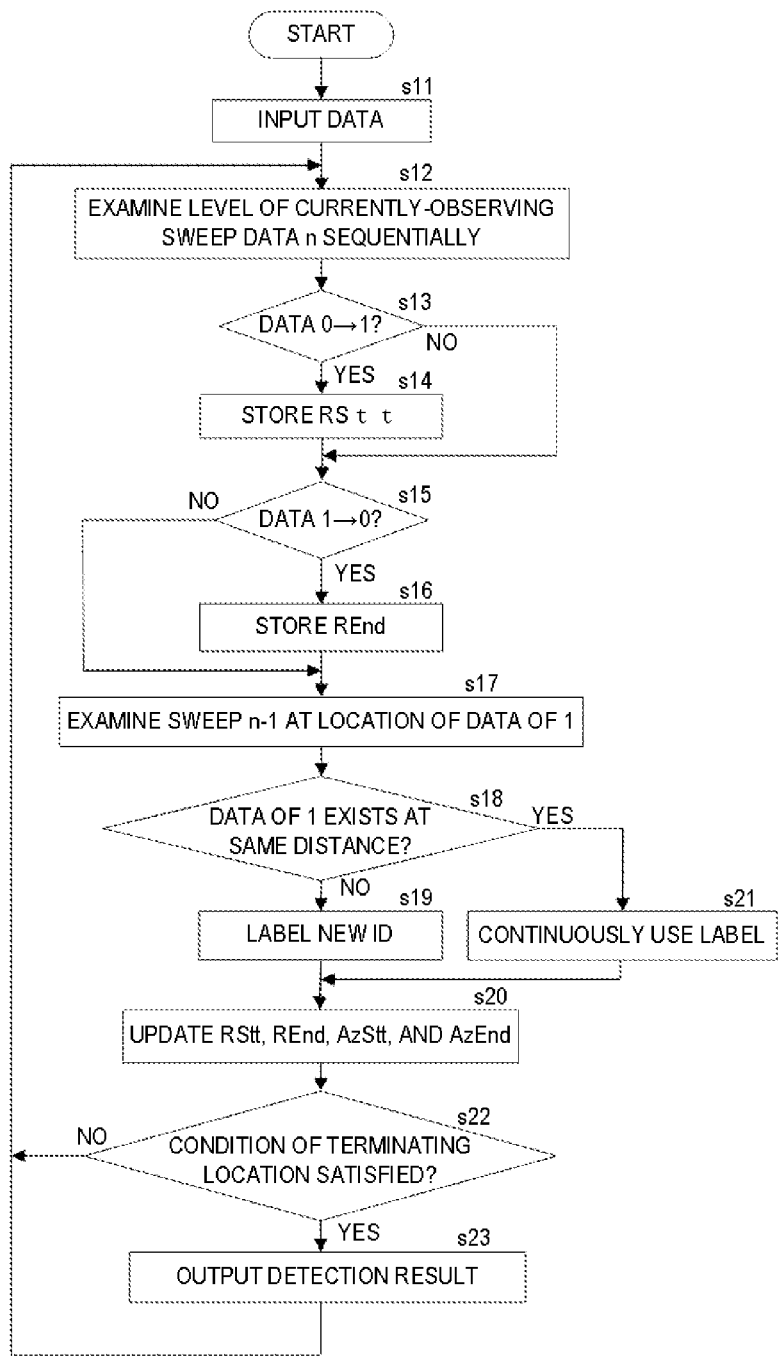
FIG. 9 is a flowchart for showing an operation of a target object detection module.

Hereinafter, processing by the target object detection module 15 is described in details, also referring to a flowchart of FIG. 9. FIG. 2B is a schematic diagram showing a relation between the target objects and the sweep data. FIG. 2B shows the sweep data when the radar image as shown in FIG. 2A is displayed. The target object detection module 15 reads out the newest sweep data (currently-observing sweep data) n as well as adjacent sweep data n−1 which is sweep data of the previous sweep from the sweep memory 14 (s11). The target object detection module 15 determines an end location of each target object based on the two sweep data. In this embodiment, the end location of the target object includes starting locations in both the azimuth direction and the distance direction, and terminating locations in both the azimuth direction and the distance direction. In this embodiment, the starting location in the azimuth direction is referred to as "AzStt," the starting location in the distance direction is referred to as "RStt," the terminating location in the azimuth direction is referred to as "AzEnd," and the terminating location in the distance direction is referred to as "Rend." When the target object detection module 15 determines that a target object exists based on the echo signals, it assigns an identifier (ID1, ID2, etc.) to these end locations of each target object, stores the identifiers in a table, and updates the table when necessary. Thereby, even if the continuity of the echo signal along the distance direction on a given azimuth once breaks off and the echo signal again appears in the same azimuth, the target object detection module 15 can output the individual end locations of each target object.

The target object detection module 15 examines the levels of the echo signals of the currently-observing sweep data n sequentially from the nearest location to the most distant location from own ship, in order to determine the existence of a target object (s12). Echo signals are binarized according to a level from which the existence of the target object can be determined (threshold). That is, the target object detection module 15 sets the sample data having a level more than the threshold to 1 and sets the sample data having a level below the threshold to 0. The target object detection module 15 determines that a target object exists at the location where the sample data is 1, and a target object does not exist at the location where the sample data is 0. Note that, although all the locations with 0-level sample data are identified as locations where no target objects exist (for example, the identifier ID0 is assigned), a different identifier (ID1, ID2, etc.) is assigned for each target object if the sample data is 1.

Figure 3A:
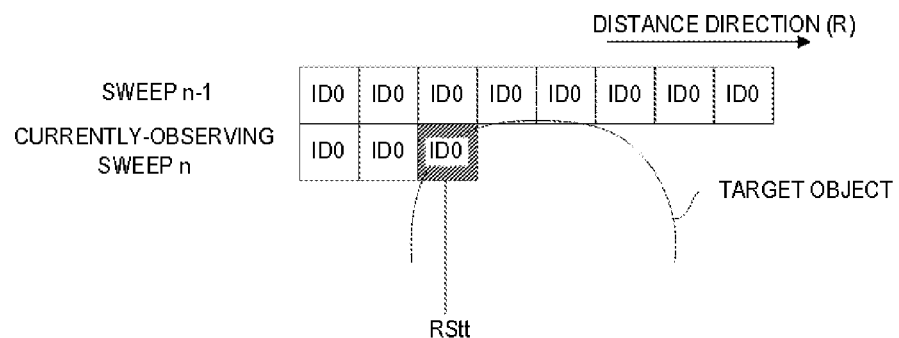
FIGS. 3A to 3C are views illustrating particular processing for detecting a target object.
Figure 3B:
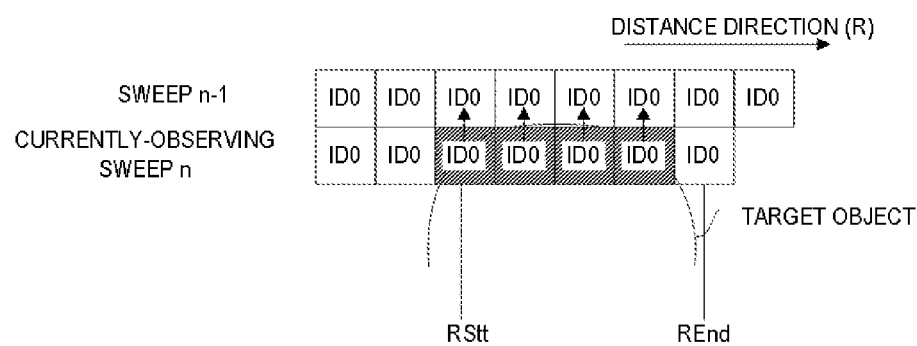

FIGS. 3A to 3C, 4A to 4C, 5A and 5B, 6A to 6C, and 7 are views illustrating particular processing for detecting a target object based on the echo signals. As shown in FIG. 3A, when the sample data which first becomes 1 from 0 is inputted (s13), the target object detection module 15 temporarily stores the location of the sample data indicating 1 as the starting location RStt in the distance direction (s14). Then, as shown in FIG. 3B, the target object detection module 15 further examines the echo signals in the distance direction, and when the sample data which becomes again 0 is inputted (s15), the target object detection module 15 temporarily stores the location of the sample data indicating 0 as the terminating location REnd in the distance direction (s16).

Figure 3C:
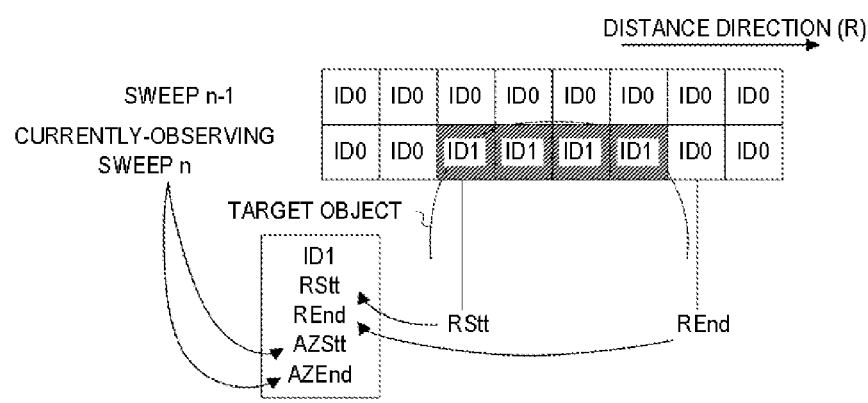

Then, as shown in FIG. 3C, the target object detection module 15 compares the sample data at respective locations where the sample data becomes continuously 1 with the sample data of the sweep data n−1 at the same distance, respectively (s17). If the sample data with 1 do not exist in the sweep data n−1 at the same distance, respectively (that is, the sample data are 0 at all the locations) (s18), a new ID is assigned as a new target object being detected (s19). For example, ID1 is assigned to a first-detected target object. Here, the target object of ID1 is described in a table so as to have end locations in the distance direction at the starting location RStt and the terminating location REnd which were stored temporarily in the processing shown in FIGS. 3A and 3B. In addition, the azimuth corresponding to the currently-observing sweep data n is described in the table as the starting location AzStt and the terminating location AzEnd in the azimuth direction (s20).

Figure 4A:
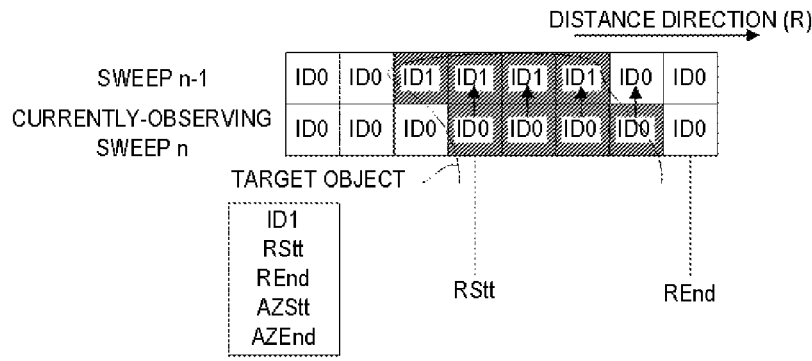
FIGS. 4A to 4C are views illustrating another particular processing for detecting a target object.
Figure 4B:
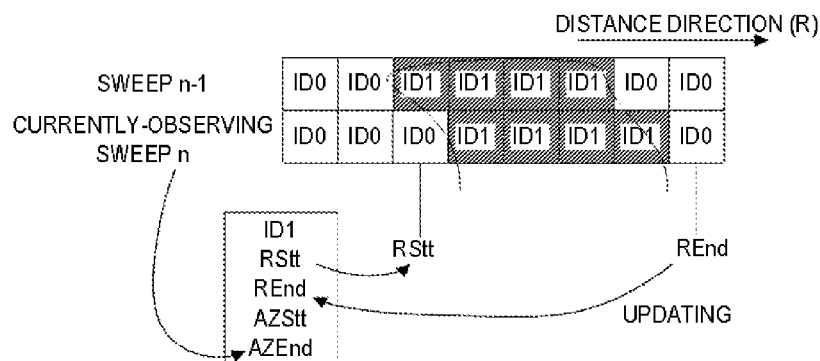

On the other hand, as shown in FIG. 4A, as a result of comparing the sample data at every location where the sample data becomes 1 continuously with the sample data of the sweep data n−1 at the same distance, respectively, if the sample data with 1 exist in the sweep data n−1 (s18), the target object detection module 15 performs processing for continuously using (reusing) the same identifiers assigned in the sweep data n−1 (s21). That is, as shown in FIGS. 4A and 4B, when ID1 is assigned in the sweep data n−1, ID1 is also assigned in the currently-observing sweep data n and, the starting location AzStt and the terminating location AzEnd in the azimuth direction, and the starting location RStt and the terminating location REnd in the distance direction are updated (s20). Note that the starting location RStt is updated when RStt stored temporarily in the currently-observing sweep data n is smaller than RStt described in the table (which means the object is closer to own ship). Meanwhile, the terminating location REnd is updated when REnd stored temporarily in the currently-observing sweep data n is larger than REnd described in the table (which means the object is more distant from own ship). Moreover, regarding the starting location AzStt in the azimuth direction, the value described in the table is held, and the terminating location AzEnd is updated by the azimuth which corresponds to the new sweep data n. Thus, each target object is detected in consideration of the continuity of the echo signals in the distance direction and the azimuth direction.

Figure 4C:
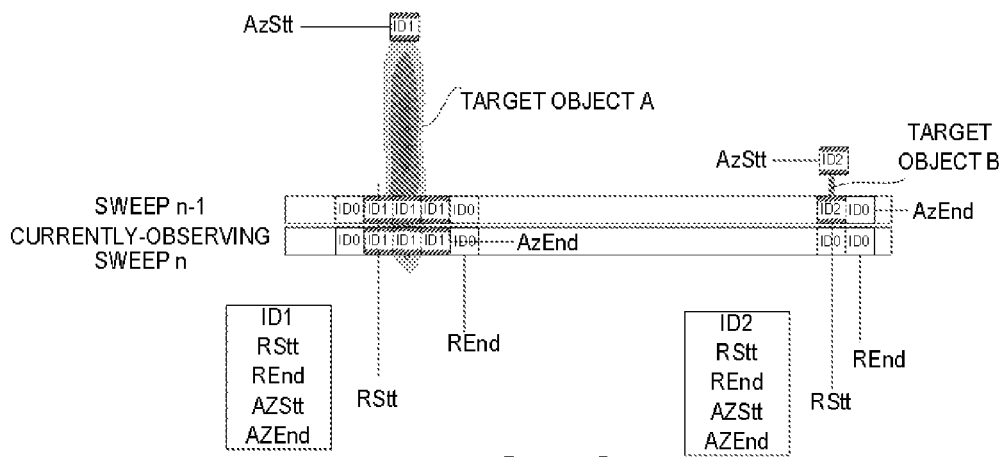

When no sample data with 1 exist in the sweep data n−1 at the same distance, the target object detection module 15 assigns a new ID (for example ID2) and for example as shown in FIG. 4C, the target detection module 15 can detect the target object A as well as the target object B which exists at a more distant location in the same azimuth as different target objects. Therefore, a target object can suitably be detected even if the continuity of the echo signals breaks off in the distance direction, by determining the starting location and the terminating location in consideration of the continuity of the echo signals in the distance direction and the azimuth direction for every target object.

Figure 5A:
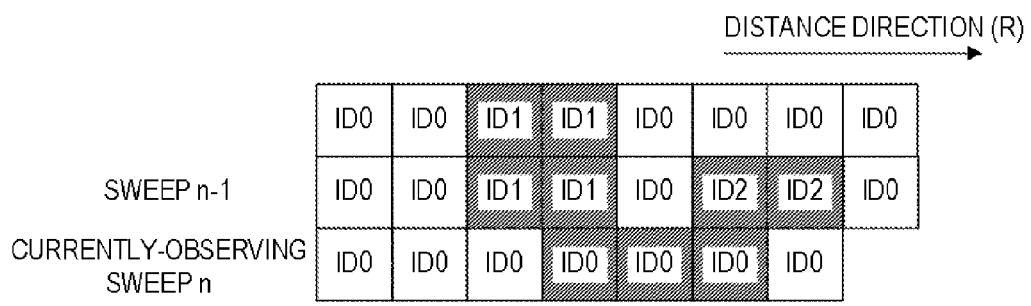
FIGS. 5A and 5B are views illustrating processing when detecting a plurality of target objects.
Figure 5B:
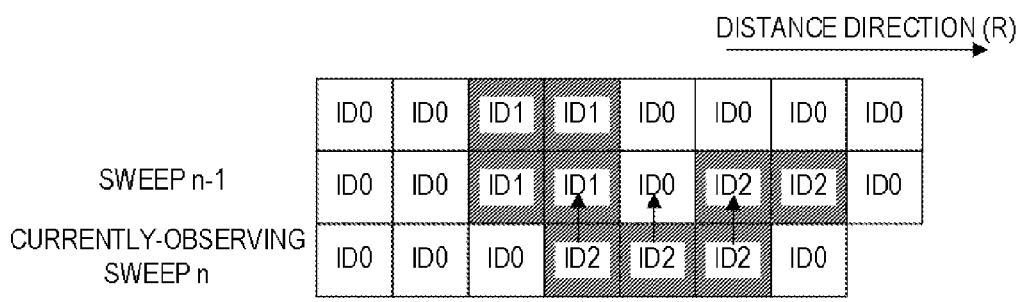

Note that, as shown in FIG. 5A, even if the sample data continuously indicate 1 when comparing the sample data with those of the sweep data n−1, different IDs may be assigned according to locations. In this case, as shown in FIG. 5B, the last assigned ID is used (in this example, ID2).

Figure 6A:
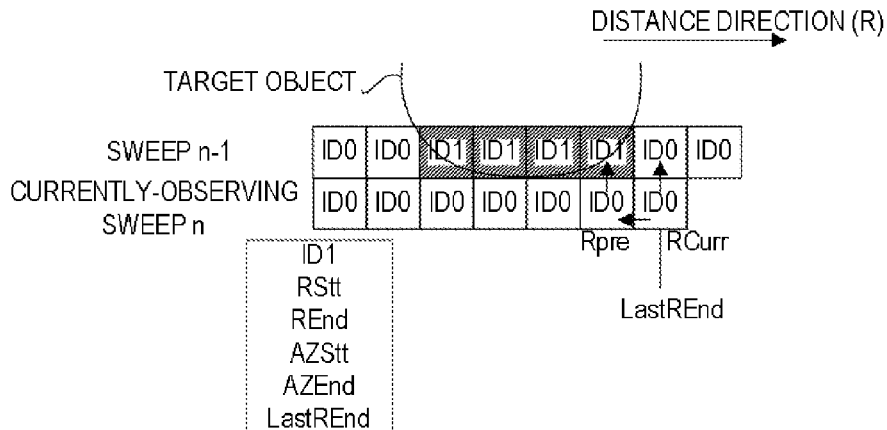
FIGS. 6A to 6C are views illustrating processing for determining a terminating location of a target object.

The target object detection module 15 then determines the terminating location of the target object if the condition as shown in FIG. 6A is satisfied (s22), and it outputs the detection result to the target object tracking module 19 (s23). That is, the target object detection module 15 outputs AzStt, RStt, AzEnd, and REnd of each target object described in the table to the target object tracking module 19 as the detection result if the following conditions are satisfied: during the process of examining each sample data of the currently-observing sweep data n, (1) the value of a currently observing sample data (RCurr shown in FIG. 6A) is 0; (2) the sample data of the sweep data n−1 at the same distance is 0; (3) the previous sample data Rpre along the distance direction (location closer to own ship) is 0; and (4) the sample data of the sweep data n−1 at the same distance as the sample data Rpre is 1. That is, in FIG. 6A, AzStt, RStt, AzEnd, and REnd which were updated in the sweep data n−1 are outputted.

Figure 6B:
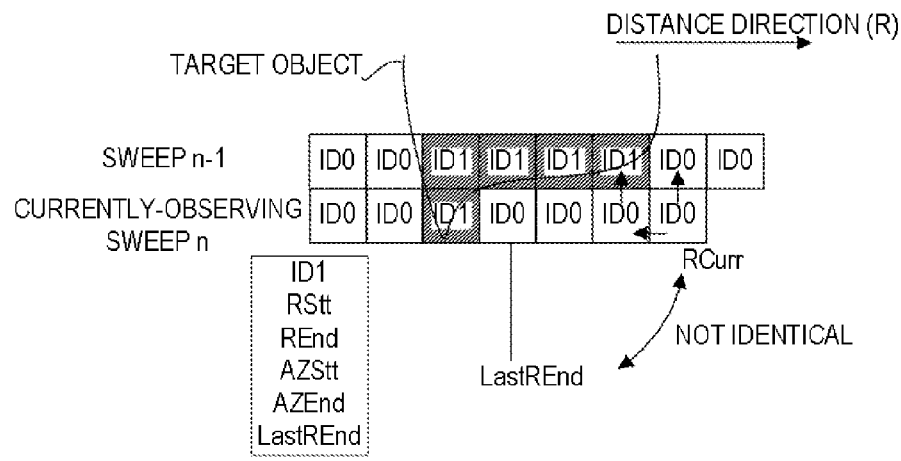
Figure 6C:
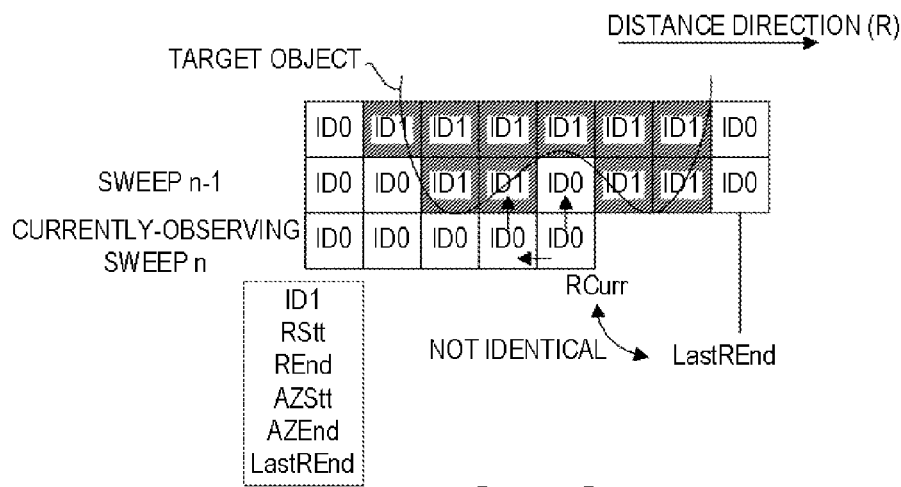

However, with the above conditions alone, as a target object showing continuity in its echo signals may be inputted at a location closer to own ship than the currently-observing sample data RCurr of the currently-observing sweep data n as shown in FIG. 6B, or at a location more distant from own ship than the currently-observing sample data RCurr of the currently-observing sweep data n as shown in FIG. 6C, the target object detection module 15 adds the following conditions.

That is, as shown in FIGS. 6A to 6C, the target object detection module 15 temporarily stores in the table, the location where the sample data last becomes 0 from 1 as a temporary terminating location LastREnd, during the process of examining the echo signals of each sweep data. Then, as shown in FIG. 6A, the target object detection module 15 outputs the detection result, when the location of the currently-observing sample data RCurr and the temporary terminating location LastREnd are identical. On the other hand, the target object detection module 15 does not output the detection result and continues carrying out the target object detection when the temporary terminating location LastREnd exists at a location closer to own ship than the currently-observing sample data RCurr as shown in FIG. 6B, and when the temporary terminating location LastREnd exists at a location more distant from own ship than the currently-observing sample data RCurr as shown in FIG. 6C.

Note that, as shown in FIGS. 5A and 5B, also when two or more target objects are detected, the detection results of all the target objects are outputted if the conditions shown in FIG. 6A are satisfied.

Figure 7:
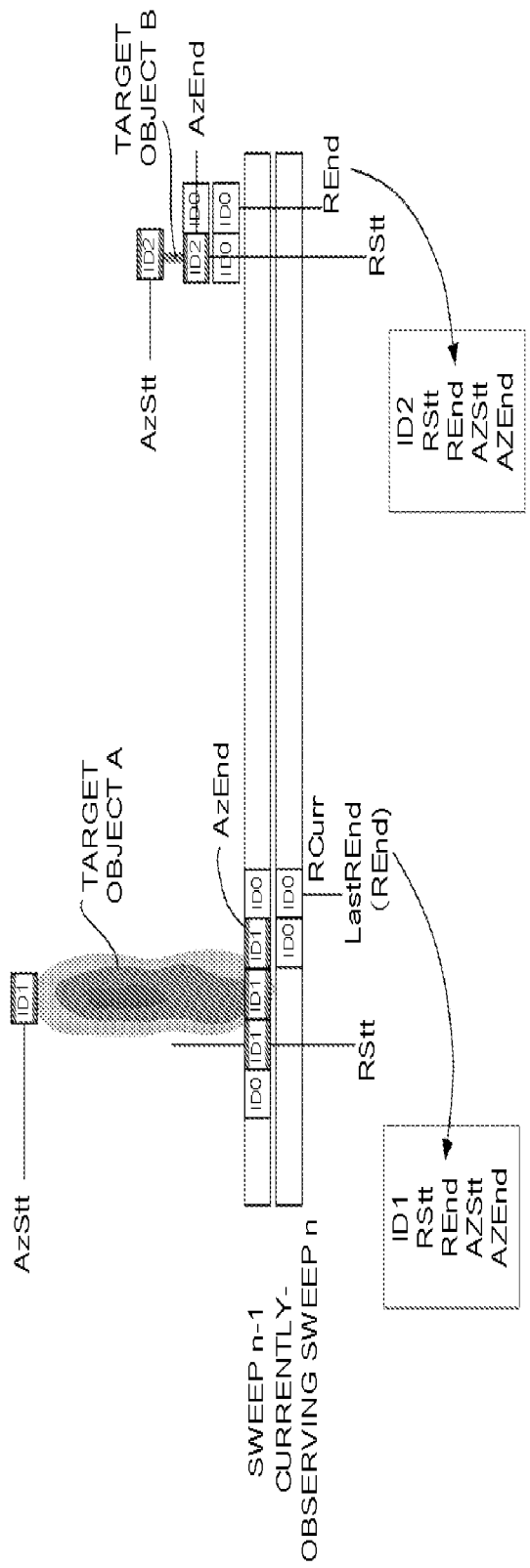
FIG. 7 is a view showing an example for outputting the terminating locations for every target object.

Thereby, for example, as shown in FIG. 7, also in the situation where different target objects A and B exist in the same azimuth, the end locations of the target objects A and B can be outputted individually.

The detection results outputted as described above are used for tracking the target objects by the target object tracking module 19. The target object tracking module 19 calculates, for example values, such as a width of a target object in the distance direction (RWidth=REnd−RStt); a width of the target object in the azimuth direction (AzWidth=AzEnd−AzStt); a center location of the target object in the distance direction (R=RStt+RWidth/2); and a center location of the target object in the azimuth direction (Az=AzStt+AzWidth/2). The target object tracking module 19 determines whether the target object is to be tracked (such as whether it is a ship or land) based on the values. For the target object determined to be tracked, a velocity vector and the like is calculated based on a change of its location with time. Accordingly, this radar apparatus can be put to practical use, for example, for a collision prevention device by tracking the target object.

As described above, even if a target object which consists of an echo signal which looks like a terminating location of the target object and an echo signal which reappears once again after that, the target object detection of this embodiment does not need to perform an additional process to determine it as one target object as a target object was considered existing at the location where the continuity broke off Therefore, a true terminating location can exactly be detected, even if it is a target object having a complicate shape, or even if it is a target object surrounded by other target objects.

Figure 8A:
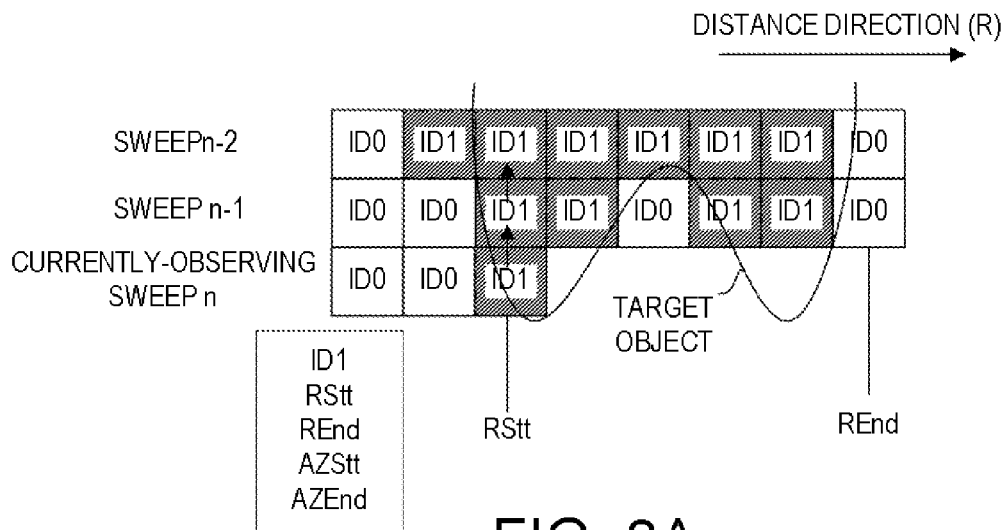
FIGS. 8A and 8B are views illustrating processing for detecting a target object by using three or more sweep data.

Note that the example where the target object detection is carried out using two sweep data is shown above in this embodiment. However, as shown in FIG. 8A, the target object detection may be performed using three or more sweep data. In this case, ID assignment processing is performed not only on sweep data n−1 but also on sweep data n−2. If no target object exist both in the sweep data n−1 and n−2 (the sweep data are ID0), new IDs are assigned. However, during the ID assignment processing if different IDs are assigned at different locations, the target object detection module 15 selects with a higher priority the sweep data n−1 rather than the sweep data n−2. For example, if the sweep data n−2 indicates ID1 and the sweep data n−1 are assigned with ID2, ID2 takes over.

Figure 8B:
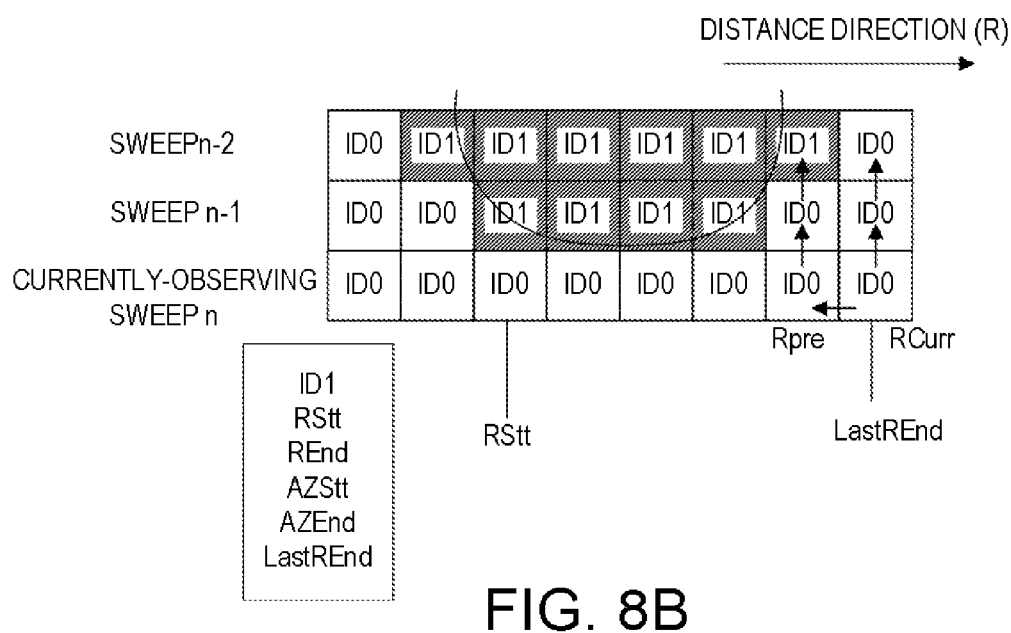

When performing the target object detection using three or more sweep data, the target object detection module 15 outputs the detection results, for example, as shown in FIG. 8B, when the value of the currently-observing sample data RCurr is 0, the sample data of the sweep data n−2 at the same distance is 0, the previous sample data Rpre along the distance direction (location closer to own ship) is 0, the sample data of the sweep data n−1 at the same distance as the sample data Rpre is 0, and the sample data of the sweep data n−2 at the same distance as the sample data Rpre is 1.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A detection device, comprising:
an image data generation module for generating image data based on echo signals; and
a target object detection module for determining an existence of a target object based on a level of the echo signal at each location of the image data for every azimuth;
wherein the target object detection module determines a continuity of the echo signals in a distance direction and an azimuth direction for every target object, and outputs an end location for each target object based on a determination result at a plurality of locations adjacent to a location determined as being a non-target object location.

2. The detection device of claim 1, wherein the target object detection module outputs a terminating location of the target object, when relative to a location determined as being a non-target object location, it determines that a target object does not exist at an adjacent location along the same azimuth and an adjacent location in another azimuth.

3. The detection device of claim 2, wherein the target object detection module saves a last location, determined as being a non-target object location, as a temporary terminating location for every azimuth, and outputs the corresponding location as the terminating location of the target object, when a location determined as being a non-target location coincides with the temporary terminating location.

4. The detection device of claim 1, wherein the target object detection module determines a location, determined as being a target object location, as a starting location of the target object, when relative to the location determined as being a target object location it determines that a target object does not exist at an adjacent location along the same azimuth and an adjacent location in another azimuth.

5. The detection device of claim 1, wherein the target object detection module assigns different identifiers to different target objects.

6. The detection device of claim 1, wherein the target object detection module compares the echo signals of at least two adjacent azimuths.

7. The detection device of claim 1, wherein the target object detection module compares the echo signals located at the same distance from the device.

8. The detection device of claim 1, further comprising a sweep memory for storing the inputted echo signals according to their azimuth and distance;
wherein the target object detection module reads out the echo signals from two adjacent azimuths from the sweep memory, and examines the levels of the echo signals of the observing azimuth, from the closest location to own ship to the most distant location; and
wherein the target object detection module compares the echo signal at each location determined as being a target object location with the echo signal at the same location in an another adjacent azimuth and, when the target object detection module determines that a target object exists at the same distance in another azimuth, it determines that the target object of the observing azimuth and the target object in the other azimuth are the same target object.

9. The detection device of claim 8, wherein the target object detection module outputs as the end location, the location of the echo signal of the observing azimuth that is determined as being a non-target object location, when it determines that a target object does not exist at a location at an adjacent distance along the same azimuth and a location at the same distance in another azimuth, and when a distance from own ship to the location determined as being a non-target object location is the same as a distance from own ship to a location that is first determined as being a non-target object location after locations determined as being target object locations continuously exist.

10. A radar apparatus, comprising:
the detection device of claim 1;
an antenna for discharging electromagnetic waves for every azimuth, receiving the echo signals reflected on each target object, and inputting the echo signals into the image data generation module; and
a display module for displaying a target object based on the image data generated by the image data generation module and the location of the target object determined by the target object detection module.

11. A detection method implemented in a detection device, the method comprising:
inputting echo signals and generating image data based on the echo signals; and
determining an existence of a target object based on a level of the echo signal at each location of the image data for every azimuth;
wherein the step of determining the existence of a target object comprises determining a continuity of the echo signals in a distance direction and an azimuth direction for every target object, and outputting an end location of each target object based on a determination result at a plurality of locations adjacent to a location determined as being a non-target object location.

12. A non-transitory computer readable storage medium having stored thereon a computer executable program that, when executed causes the computer to execute the steps of:
inputting echo signals and generating image data based on the echo signals; and
determining an existence of a target object based on a level of the echo signal at each location of the image data for every azimuth;
wherein said determining the existence of a target object includes determining a continuity of the echo signals in a distance direction and an azimuth direction for every target object, and output an end location of each target object based on a determination result at a plurality of locations adjacent to a location determined as being a non-target object location.

* * * * *